July 29, 1924.
W. A. SHALLENBERG
1,502,751
AIR COMPRESSOR FOR MOTOR VEHICLES
Filed April 28, 1923   2 Sheets-Sheet 1
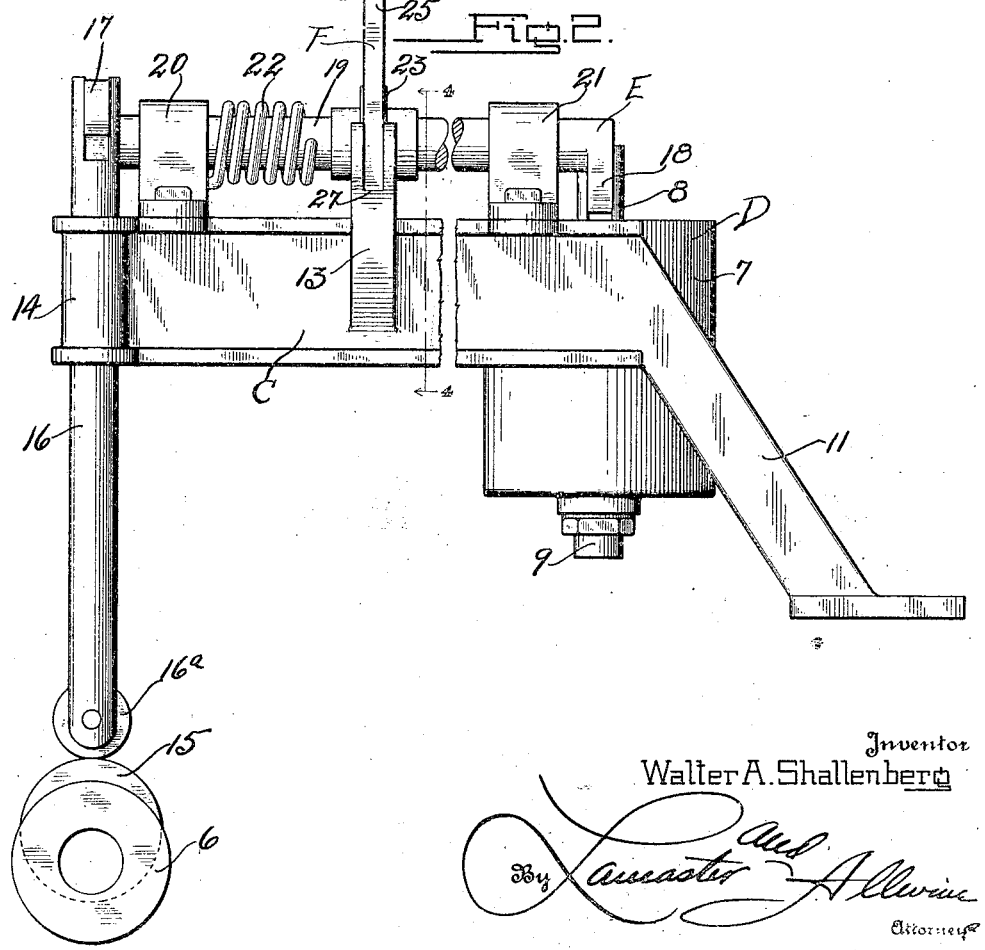
Inventor
Walter A. Shallenberg
By Lancaster and Allwine
Attorneys July 29, 1924.
W. A. SHALLENBERG
1,502,751
AIR COMPRESSOR FOR MOTOR VEHICLES
Filed April 28, 1923    2 Sheets-Sheet 2
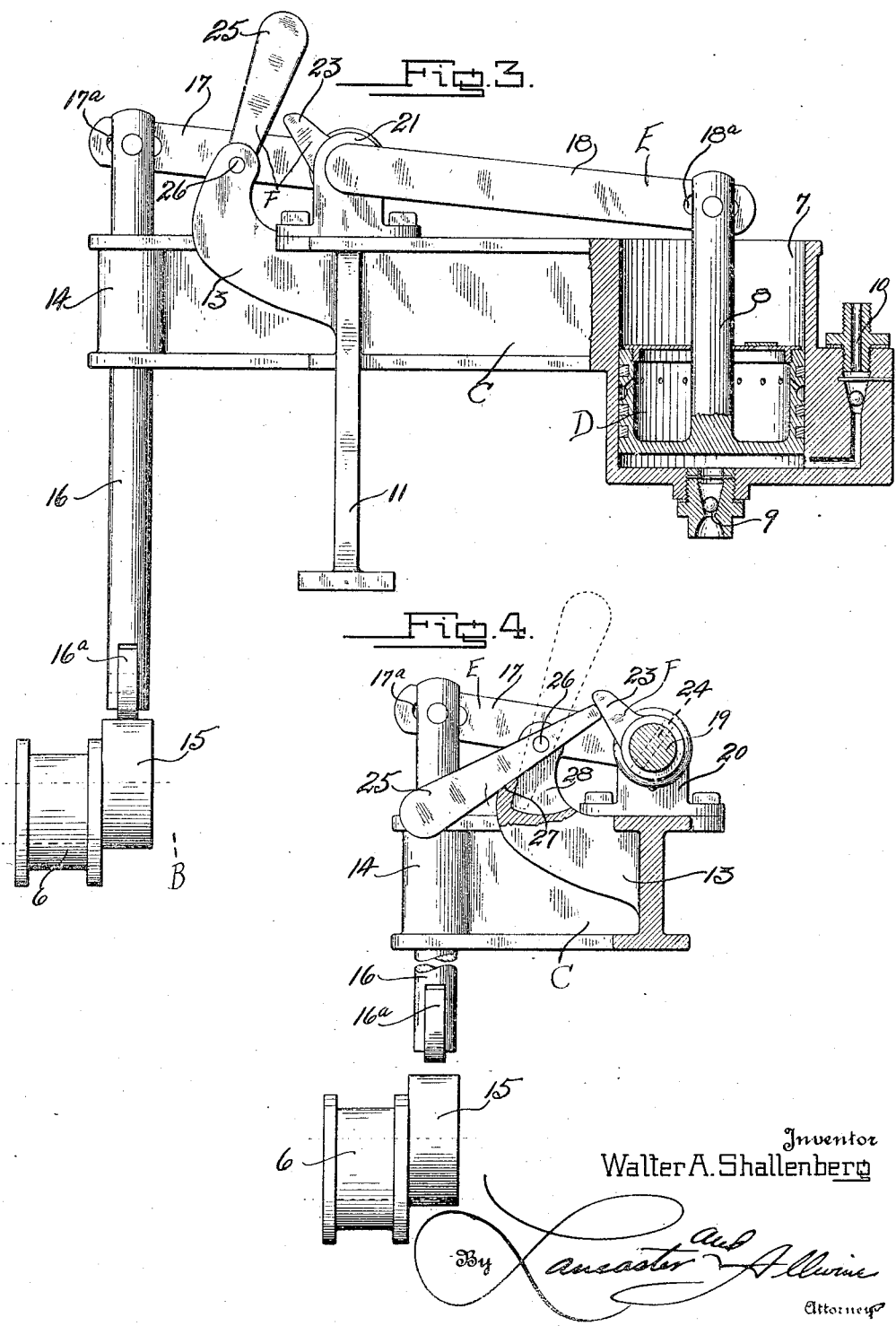
Inventor
Walter A. Shallenberg Patented July 29, 1924.

1,502,751

UNITED STATES PATENT OFFICE.

WALTER A. SHALLENBERG, OF SALEM, OHIO.

AIR COMPRESSOR FOR MOTOR VEHICLES.

Application filed April 28, 1923. Serial No. 635,325.

*To all whom it may concern:*

Be it known that I, WALTER A. SHALLENBERG, a citizen of the United States, residing at Salem, in the county of Columbiana and State of Ohio, have invented certain new and useful Improvements in Air Compressors for Motor Vehicles, of which the following is a specification.

This invention relates to an air compressing device or pump adapted to be used in connection with automobiles, and the primary object of the invention is to provide an air compressor which may be used to inflate the pneumatic tire of the vehicle by use of power from its own engine.

A further object of the invention is the provision of an efficient air compressor which is composed of but few parts, is easy to operate and extremely desirable on account of its compactness and ease with which it is mounted to receive its power from a cam rotating portion of the engine.

A still further object is to provide an air compressor for automobile engines having a simple construction whereby the operating means may be placed in an inoperative relation without moving or disengaging the whole structure.

No claim is made to the novel construction of piston as shown in the accompanying drawings, it being the subject matter of my copending application for Letters Patent, Serial No. 635,324, filed Apr. 28, 1923.

Other objects of the invention will appear in the following detailed description, taken in connection with the accompanying drawing, forming a part of this specification, and in which drawing:

Figure 1 is a plan view of the air compressor showing it in operative relation to an internal combustion engine of an automobile deriving the power from the drive shaft.

Figure 2 is a detailed front elevation of the air compressor parts being broken away to condense the view.

Figure 3 is a detailed side elevation of the air compressor with parts broken away for clearness.

Figure 4 is a sectional view on the line 4—4 of Figure 2, looking in the direction of the arrows.

Referring to the drawings, in detail, wherein similar reference characters designate corresponding parts throughout the several views, the letter A designates an internal combustion engine of any type, having a drive shaft B. C represents the supporting bracket; D, the air compressor or pump, while E is the operating and connecting means between the drive shaft B and piston D; and F is the locking means for holding the operating means out of operative relation to the drive shaft.

Referring to the internal combustion engine A, including among its several well known parts a drive shaft B with a fan belt pulley 6 mounted thereon. This engine may be of any type and the air compressor may be mounted to operate in connection with any revolving portion of a drive shaft or part driven thereby, and it must be understood that I do not limit myself to using the device as shown in the preferred form.

The support bracket C is preferably formed of metal integral with a cylinder 7 having a piston 8 mounted therein in the well known way. Inlet ball valve 9 may be carried in the bottom of cylinder 7 to allow for passage of air only when drawn in by the up stroke of the piston and a like outlet valve 10 is provided to open when piston 8 compresses and forces out the air which it had primarily drawn in. Each valve remains closed when the other is opened, and since this action is not new, nor claimed in this application, it will not be further described. Bracket C further consists of arm 11 which is adapted to engage a portion of the chair frame, as shown in Figure 1 to aid in supporting the device. Extending arm 12 also affords a support when attached to the engine block A. A bracket 13 preferably integral with support C may be supplied to hold a portion of a locking member F, which will hereafter be fully described, while bearing 14 may be formed to accommodate one member of the operating means E.

Concerning now the operating and connecting means E, such may comprise a cam 15 mounted on the drive shaft B adjacent the fan belt pulley 6. A vertical reciprocating rod 16 with a non-friction roller 16ª mounted at one end is slidably mounted in bearing 14 and reciprocates when the air compressor is in operation by riding over the surface of rotating cam 15. Levers 17 and 18 provided with slots 17ª and 18ª engage the reciprocating rod 16 and piston 8 respectively and are connected intermediate the engaging ends by a shaft 19 which forms a pivotal point by being supported upon bracket C by bearings 20 and 21 as shown in Figure 2. To insure perfect following of the surface of cam 15 a spring 22 may be coiled around shaft 19, rigidly attached to bearing 20 and shaft 19 and by its expansive action urges downwardly the reciprocating rod 16. This force, together with the weight of lever 17, rod 16 and roller 16ª assures perfectly smooth operation.

To lock the operating means E out of engagement with the cam and its rotating shaft B, the means F may include an outstanding lug 23 rigidly fixed to shaft 19 by a pin or analogous means 24 and a coacting lever 25 pivotally mounted on bracket 13 as at 26. Lever 25, enlarged at one end to hold itself open when the air compressor is in an operative or unlocked position, pivots near its smaller end and rests in a locked position by engaging the shoulder 27 of bracket 13 and lug 23 as shown in Figure 4. The operative or unlocked position is shown in dotted lines of Figure 4 and demonstrates how cavity 28 of bracket 13 accommodates the lever 25.

Changes in details may be made without departing from the spirit or scope of my invention; but,

I claim:

1. In an air compressor, the combination with a cylinder and piston, of an operating cam, operating means connecting said cam with said piston comprising a reciprocating rod, a plurality of levers, a connecting shaft between said levers, support for the operating means having bearings for said shaft, and a spring coiled about the connecting shaft with one of its ends rigidly held thereby and the other engaging the support.

2. In an air compressor, the combination with a cylinder and a piston, of an operating cam, a reciprocating rod operated by said cam, levers carried by the reciprocating rod and pistons, an elongated connecting shaft for said levers, a support bracket rigid with said cylinder having a plurality of bearings for the connecting shaft and locking means for holding the operating means out of engagement with said operating cam comprising a lug rigid with said shaft, a pivoted stop arm held in operative relation thereto, and a bracket having a recess adapted to receive an end of the stop arm when out of engagement with said lug.

3. In an air compressor, the combination with a cylinder and a piston, of an operating cam, a reciprocating rod operated by said cam, an extended support for said cylinder and reciprocating rod, levers operatively attached to the piston and said reciprocating rod, a shaft rigidly connecting the adjacent ends of said levers, and bearings for said shaft carried by the support adjacent its opposite ends.

WALTER A. SHALLENBERG.